US010475068B2

(12) United States Patent
Armbrust et al.

(10) Patent No.: US 10,475,068 B2
(45) Date of Patent: Nov. 12, 2019

(54) SYSTEMS AND METHODS OF GENERATING DIGITAL CAMPAIGNS

(71) Applicant: OwnLocal Inc., Austin, TX (US)

(72) Inventors: Lloyd Armbrust, Austin, TX (US); Jorge Gonzalez, Austin, TX (US); Andrew McFadden, Austin, TX (US); Jason Novek, Austin, TX (US)

(73) Assignee: OwnLocal Inc., Austin, TX (US)

( * ) Notice: Subject to any disclaimer, the term of this patent is extended or adjusted under 35 U.S.C. 154(b) by 0 days.

(21) Appl. No.: 16/047,315

(22) Filed: Jul. 27, 2018

(65) Prior Publication Data

US 2019/0034964 A1 Jan. 31, 2019

Related U.S. Application Data

(60) Provisional application No. 62/538,060, filed on Jul. 28, 2017.

(51) Int. Cl.
*G06Q 30/02* (2012.01)
*G06K 9/00* (2006.01)

(52) U.S. Cl.
CPC ..... *G06Q 30/0246* (2013.01); *G06K 9/00469* (2013.01); *G06Q 30/0276* (2013.01); *G06Q 30/0277* (2013.01); *G06K 2209/01* (2013.01)

(58) Field of Classification Search
CPC ............. G06Q 30/0246; G06Q 30/0276
USPC ............................. 705/14.45, 14.72
See application file for complete search history.

(56) References Cited

U.S. PATENT DOCUMENTS

| 6,269,361 B1 | 7/2001 | Davis et al. | |
| 7,483,886 B2 | 1/2009 | Cheung et al. | |
| 8,112,312 B2 | 2/2012 | Ritter | |
| 8,538,800 B2 | 9/2013 | Gupta et al. | |
| 8,650,480 B2 | 2/2014 | Sahota et al. | |
| 8,838,657 B1* | 9/2014 | Malone | G06F 16/93 |
| | | | 707/821 |
| 2002/0188635 A1* | 12/2002 | Larson | G06F 17/243 |
| | | | 715/209 |
| 2002/0194061 A1* | 12/2002 | Himmel | G06Q 30/02 |
| | | | 705/14.56 |

(Continued)

FOREIGN PATENT DOCUMENTS

| WO | 0199016 A2 | 12/2001 |
| WO | 0201471 A1 | 1/2002 |

(Continued)

*Primary Examiner* — Scott D Gartland
(74) *Attorney, Agent, or Firm* — Toler Law Group, PC

(57) ABSTRACT

A method includes receiving data indicative of content to be published by a publisher and generating output text data based on comparing text data output by different text recognition operations on the received data. Another method includes extracting one or more text items and one or more images from the received data, determining that the content is associated with a first entity, and generating a directory webpage that includes the one or more text items and the one or more images. The directory webpage is associated with the first entity and is hosted in a subdomain of a domain associated with the publisher. A particular text item of the one or more text items, a particular image of the one or more images, or both, is associated with offer information.

18 Claims, 12 Drawing Sheets

(56) References Cited

U.S. PATENT DOCUMENTS

| | | | |
|---|---|---|---|
| 2006/0288279 A1* | 12/2006 | Yacoub | G06F 17/30011 715/205 |
| 2007/0067297 A1 | 3/2007 | Kublickis | |
| 2008/0275783 A1* | 11/2008 | Wee | G06Q 30/02 705/14.54 |
| 2009/0299820 A1 | 12/2009 | Wang et al. | |
| 2010/0333153 A1 | 12/2010 | Sahota et al. | |
| 2012/0041834 A1 | 2/2012 | McRae, II | |
| 2012/0078711 A1 | 3/2012 | Mehta et al. | |
| 2012/0155712 A1* | 6/2012 | Paul | G06K 9/00 382/105 |
| 2013/0254349 A1 | 9/2013 | Zaccagnino | |
| 2014/0067539 A1 | 3/2014 | Burt et al. | |
| 2015/0058339 A1 | 2/2015 | Nijjer et al. | |

FOREIGN PATENT DOCUMENTS

| | | |
|---|---|---|
| WO | 2008070745 A2 | 6/2008 |
| WO | 2009006561 A2 | 1/2009 |
| WO | 2009014843 A1 | 1/2009 |
| WO | 2012021820 A2 | 2/2012 |
| WO | 2015009936 A2 | 1/2015 |
| WO | 2015077149 A1 | 5/2015 |

* cited by examiner

FIG. 2

| | 119 |
|---|---|
| Name | Parker's Pub |
| Address | 123 Main St. |
| City | Anytown |
| State | |
| ZIP | |
| Latitude | |
| Longitude | |
| Phone | 999-999-9999 |
| E-mail | |
| Hours | |
| Keywords | |
| Description | |
| Features | Sports, HDTVs, Football, Baseball |
| Coupon | |
| Expiration | |
| Offers/Specials | Whiskey Wednesdays |
| Website | |
| Facebook | |
| Twitter | |
| Google Plus | |
| Foursquare | |
| LinkedIn | |
| Directory | |
| Yelp | |
| Reviews | |
| Pictures | |
| .. | |

*FIG. 5*

| | 119 |
|---|---|
| Name | Parker's Pub |
| Address | 123 Main St. |
| City | Anytown |
| State | |
| ZIP | |
| Latitude | |
| Longitude | |
| Phone | 999-999-9999 |
| E-mail | contact@ppubanytown.com |
| Hours | |
| Keywords | |
| Description | |
| Features | Sports, HDTVs, Football, Baseball |
| Coupon | |
| Expiration | |
| Offers/Specials | Whiskey Wednesdays |
| Website | |
| Facebook | |
| Twitter | |
| Google Plus | |
| Foursquare | |
| LinkedIn | |
| Directory | http://www.mylocal.anytowndaily.com/anytow... |
| Yelp | |
| Reviews | |
| Pictures | |
| ... | ... |

FIG. 6

| | 119 |
|---|---|
| Name | Parker's Pub |
| Address | 123 Main St. |
| City | Anytown |
| State | CA |
| ZIP | 99999 |
| Latitude | 34.7985 |
| Longitude | -118.863 |
| Phone | 999-999-9999 |
| E-mail | contact@ppubanytown.com |
| Hours | Sunday 10am-12am, Monday 10am-12am, Tue... |
| Keywords | Drink Specials in Anytown, Smoking Patio in... |
| Description | Parker's Pub is a neighborhood sports bar and... |
| Features | Sports, HDTVs, Football, Baseball |
| Coupon | |
| Expiration | |
| Offers/Specials | Whiskey Wednesdays |
| Website | http://ppubanytown.com |
| Facebook | https://www.facebook.com/pages/PPubAt/14379... |
| Twitter | |
| Google Plus | https://plus.google.com/18128dasdklsdk3820101... |
| Foursquare | https://foursquare.com/v/ppubatown/3f8392ac73... |
| LinkedIn | |
| Directory | http://www.mylocal.anytowndaily.com/anytow... |
| Yelp | http://www.yelp.com/biz/parkers-pub-anytown... |
| Reviews | "Very friendly staff and cheap drinks." |
| Pictures | http://s3-media.ak.yelpcdn.com/bphoto/9252sdk... |
| ... | ... |

*FIG. 7*

SYSTEMS AND METHODS OF GENERATING DIGITAL CAMPAIGNS

CROSS REFERENCE TO RELATED APPLICATIONS

The present application claims the benefit of U.S. Provisional Patent Application No. 62/538,060, entitled "SYSTEMS AND METHODS OF GENERATING DIGITAL CAMPAIGNS," filed Jul. 28, 2017, which is expressly incorporated by reference herein in its entirety.

BACKGROUND

Mobile electronic devices, such as wireless phones and tablet computers, have enabled users to access and enjoy content at virtually any time and in virtually any location. These devices have also resulted in a large online audience that businesses, advertising/marketing agencies, etc. attempt to reach. However, designing content (e.g., articles, web pages, mobile apps, advertisements, etc.) for online audiences can be expensive and time consuming. Moreover, it may be difficult to determine the success (e.g., audience penetration) of such content, because traditional measurement mechanisms, such as television ratings systems, may be unsuitable for Internet content.

BRIEF DESCRIPTION OF THE DRAWINGS

FIG. 2 is a diagram of a particular embodiment of content that may be processed by the system of FIG. 1;

FIGS. 5, 6, and 7 are diagrams that illustrate profiles that may be generated and/or updated by the system of FIG. 1;

DETAILED DESCRIPTION

Systems and methods of generating digital campaigns are disclosed. In a particular embodiment, the described techniques enable a computer system to automatically generate a digital (e.g., Internet-based) "campaign" from print content. For example, the disclosed systems and methods may receive, as input, a print advertisement that is intended for publication in a newspaper and may automatically perform a variety of Internet-based actions that collectively form a digital "campaign" designed to reach an online audience with messaging that is derived from or related to the print advertisement.

Before the popularity of the Internet, advertising typically took one of four forms: print (e.g., newspapers, magazines, etc.), television, radio, and physical display (e.g., billboards, backs of milk cartons, etc.). As Internet usage has increased, these four "traditional" media forms have experienced differing levels of downturn. Print advertising, especially newspaper advertising, has perhaps been the hardest hit by the proliferation of and increasing preference for online advertising. This impact may be magnified for newspapers that cover small communities or regions. The techniques of the present disclosure may enable such newspapers to offer digital campaign generation as an additional service for their print advertising customers, such as local businesses. For a newspaper that covers a small community or region and is losing subscribers due to the increasing popularity of internet news aggregators and social media, the additional revenue from such a service may go a long way towards keeping the newspaper in business.

Figure 1A:
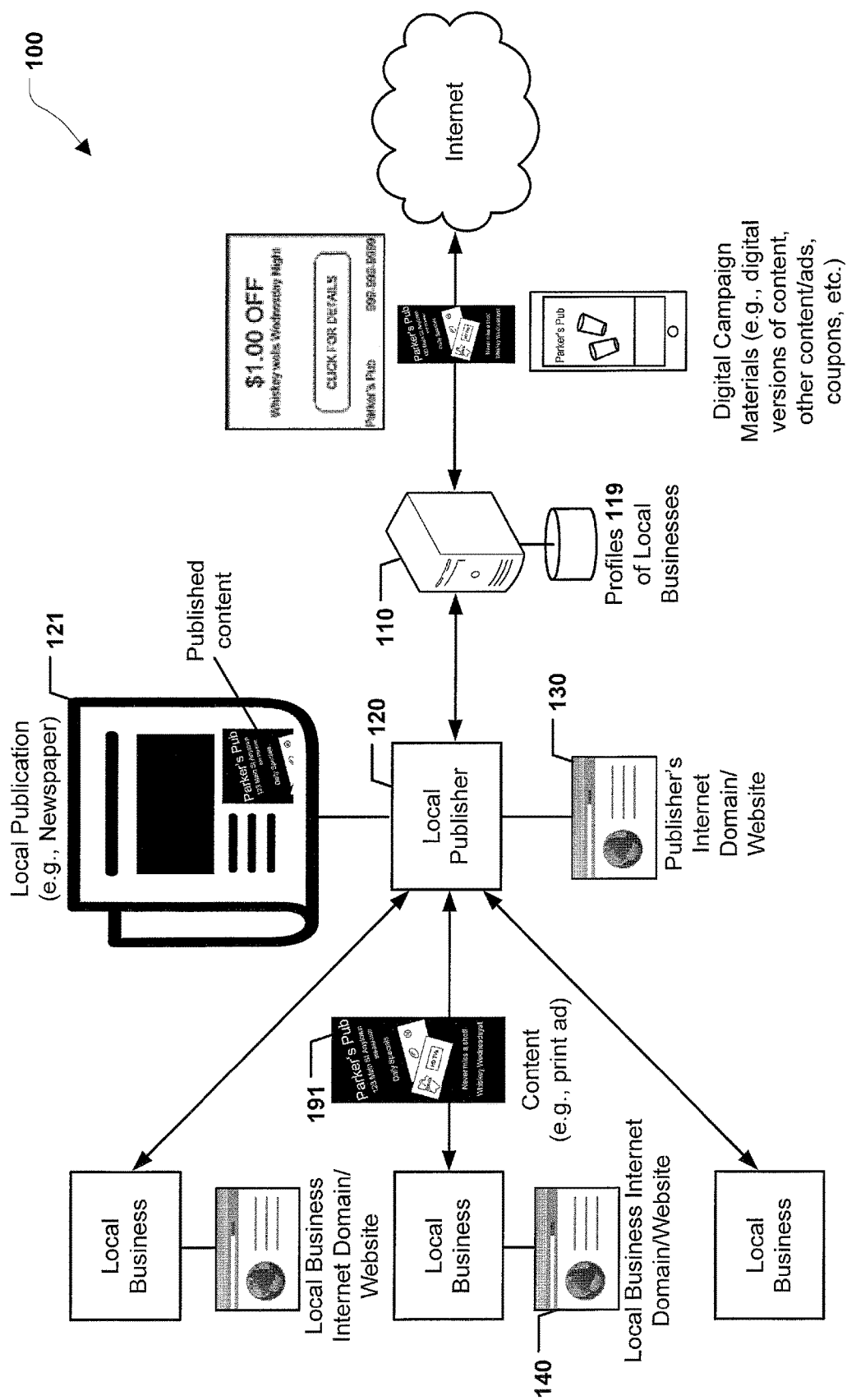
FIGS. 1A, 1B, and 1C are diagrams that illustrate a particular embodiment of a system that is operable to generate digital campaigns.
Figure 1B:
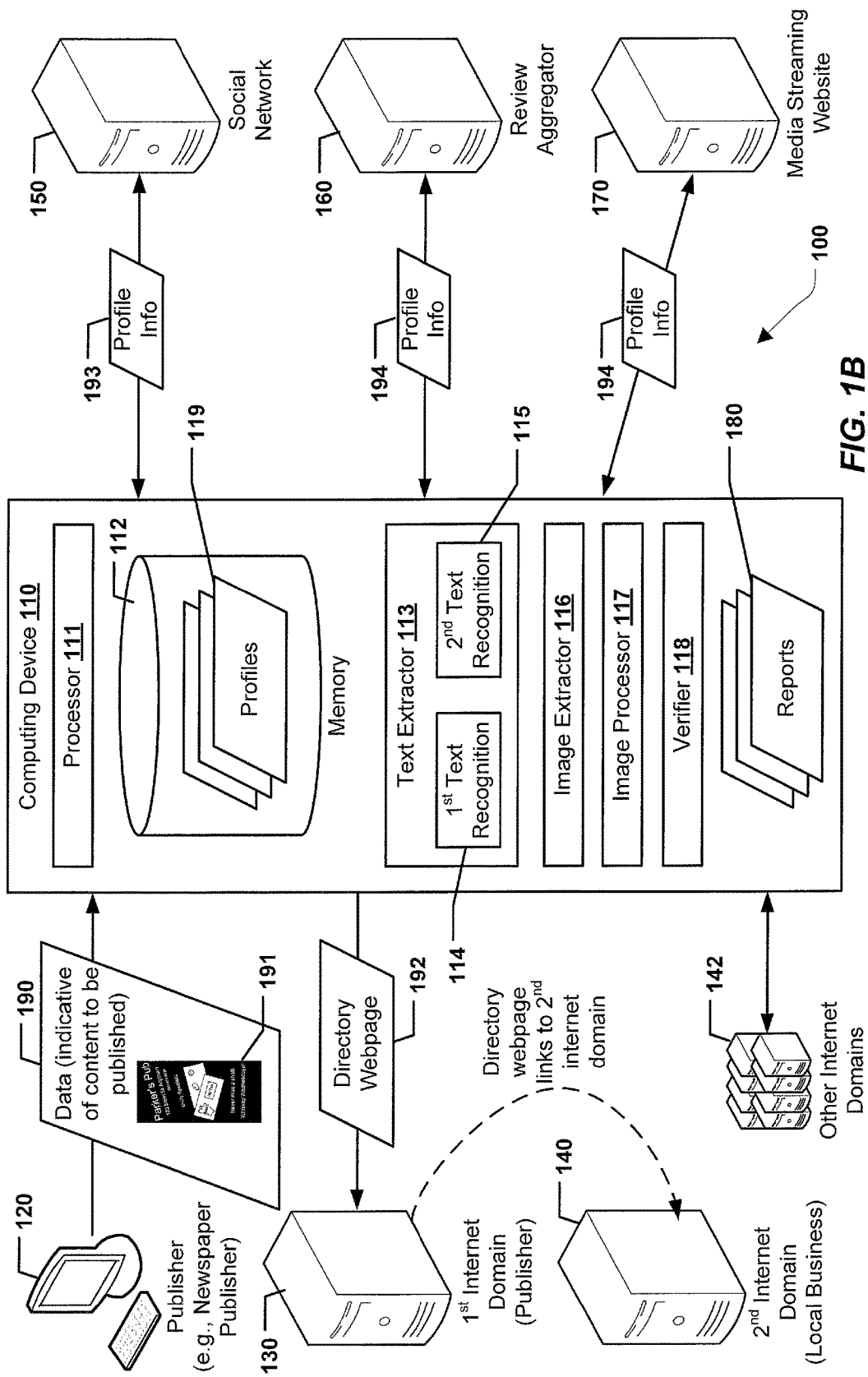

FIGS. 1A and 1B illustrate a particular embodiment of a system 100 configured to generate digital campaigns. The system includes a computing device 110, which may be a desktop computer, a laptop computer, a mobile device, a server, or some other computing device.

The computing device 110 is configured to communicate with one or more other computing devices, such as a second computing device 120 that is associated with a local publisher. Such communication may occur via one or more wired or wireless networks, such as a local area network (LAN), a wide area network (WAN), a cellular network, the internet, etc. In some examples, the local publisher is associated with publication of newspapers or other printed items (e.g., magazines, newsletters, etc.). In the example of FIG. 1A, local publisher receives content 191, such as print advertisements, that are to be published in a local publication, such as a local newspaper 121. It is to be understood that in alternative examples, the content 191 may not be an advertisement any may instead be other text and/or graphical content.

The computing device 110 is also configured to communicate with devices associated with other network-accessible entities. For example, the computing device 110 may communicate with devices in or associated with a first internet domain 130, a second internet domain 140, a social network 150, a review aggregator 160, a media streaming website 170, or any combination thereof. In an illustrative example, the first internet domain 130 is associated with the local publisher 120 and the second internet domain 140 is associated with a local business that requests publication of the content 191, such as an advertisement for the local business, in the local publication 121. As further described herein, the computing device 110 may be configured to generate and distribute digital campaign materials based on the content 191 and additional information regarding the corresponding local business.

The computing device 110 may include a processor 111 and a memory 112, which may correspond to read-only memory (ROM), random access memory (RAM), embedded storage, solid-state storage, flash memory, disk memory, etc. In some examples, the memory 112 stores software, such as instructions executable by the processor 111 to perform one or more operations described herein with respect to the computing device 110 and/or components thereof. The computing device 110 may include a text extractor 113, an image extractor 116, an image processor 117, and a verifier 118, each of which may correspond to hardware (e.g., circuitry) of the computing device 110, software executable by the processor 111, or a combination thereof. Alternatively, although shown in FIG. 1 as being part of the computing device 110, one or more of the text extractor 113, the image extractor 116, the image processor 117, or the verifier 118 may be remote to the computing device 110. For example, one or more components illustrated in FIG. 1 as being a part of the computing device 110 may alternatively be accessed by the computing device 110 as a cloud-based service, a service offered by another computing device or server, etc. Similarly, data that is shown or described as being stored at the computing device 110 may alternatively be stored at another device that is accessible to the computing device 110, such as a network-attached or cloud-based storage device.

The text extractor 113 and the image extractor 116 may be configured to extract one or more text items and one or more images, respectively, from data 190 received by the computing device 110. The data 190 may be indicative of content 191 to be published by the publisher. In some examples, the data 190 includes the content 191, which may correspond to an advertisement or other content associated with a local business that is to be published in a newspaper. For example, the data 190 may include a document or image that contains the advertisement or other content. Examples of text items that may be extracted from the data 190 include, but are not limited to, an entity name, a street address, a date or date range, a telephone number, an e-mail address, event information, offer information, etc. Examples of images that may be extracted from the data 190 include, but are not limited to, logos, photographs, drawings, etc. An example of the content 191 is illustrated in greater detail in FIG. 2. As further described herein, the computing device 110 may be configured to extract text and/or images from the data 190 and to perform one or more operations, based on the extracted text/images, to implement a digital campaign.

In a particular aspect, the text extractor 113 is configured to initiate and/or perform multiple text recognition operations with respect to the data 190. To illustrate, a first text recognition operation 114 may generate first text data and a second text recognition operation 115 may generate second text data. In some examples, at least one of the text recognition operations 114, 115 includes an optical character recognition (OCR) process. Alternatively, if the data 190 includes selectable/searchable text (e.g., American standard code for information interchange (ASCII) characters), text extraction may be performed without OCR.

In some examples, XML data is received with an advertisement or other content, where the XML data includes information such as address, phone number, run dates, etc. If such XML data is received, it may be compared with the text data generated from the OCR process. Alternatively, or in addition, if an unflattened portable document format (PDF) file is received, extraction of text embedded within the PDF file may include text that is present in non-visible layers of the PDF file, as further described below.

The text extractor 113 may generate output text data based on the first text data and the second text data. For example, when the first text data and the second text data include common text, the common text may be included in the output text data. That is, text output by both text recognition operations 114, 115 may be considered relatively reliable, and may therefore be included in the output text data of the text extractor. Conversely, when certain text is included in the first text data but not the second text data (or vice versa), then the text extractor 113 may perform an additional determination as to whether to include that text in the output text data. In some examples, whether or not the text is included in the output text data is based on confidence data associated with the text. To illustrate, each item of text (e.g., character, word, or collection of words) recognized by the operations 114, 115 may have a confidence value, where text having a higher confidence value is predicted to be more reliable than text having a lower confidence value. The confidence value may be based on the quality of the image or document from which the text is being extracted, how "sharp" the lines/edges/corners/curves of the text are, how much noise is present in the image or document, how closely the font of the text matches a pre-stored font, etc. Thus, in some examples, when one text recognition operation 114, 115 recognizes text that the other operation 114, 115 does not, the text may not be included in the output text of the text extractor unless the confidence value of the text exceeds a threshold.

In particular aspects, the text recognition operations 114, 115 include standalone text recognition at the computing device 110 as well as querying one or more cloud-based text recognition services. The text data generated by each text recognition operation 114, 115 may be scored based on how "correct" the text data is in terms of grammar and/or spelling. For example, grammar/spellcheck software libraries that have been modified for operation on promotional/advertising data may score the text data. To illustrate, such modified libraries may be more permissive regarding homonymous spelling errors, because creative misspelling (also known as "sensational spelling") is a common advertising/marketing/branding tactic (e.g., "fil-A" rather than "filet"). Text data generated locally at the computing device 110 (e.g., via OCR) may have a first score, text data generated by a cloud-based service may have a second score, text extracted out of a PDF file may have a third score, etc. The text data having the highest score(s) may be selected as the output text.

In some examples, text data generated by the various text recognition operations 114, 115 is also compared to previously recognized text. For example, if the content 191 is from a particular business, then the text generated by the text recognition operations 114, 115 may be compared to text from previous content from the same business. In this example, text that more closely matches previous content may be given a higher score. Alternatively, or in addition, a unique fingerprint value is determined for each content item processed at the system 100. If a newly received content item has the same fingerprint value as a previously received content item, certain operations (e.g., text extraction and text recognition) may be skipped for the newly received content item. This may save computational resources when the run date of a content item (e.g., a week-long print advertisement in a newspaper) is longer than the period of a content feed (e.g., a daily content feed from the newspaper).

In some aspects, certain operations may be skipped even if content items don't have identical fingerprint values. For example, if it is determined that the content 191 is from a previously identified and verified advertiser, then operations to identify the advertiser, determine the advertiser's phone number and website, etc. may be skipped. To illustrate, an advertiser "Joe's Plumbing" may appear in multiple publications by virtue of advertising in multiple print publications that cover the same or neighboring communities or geographic regions. The system 100 may advantageously maintain a single record rather than multiple records for "Joe's Plumbing" based on fingerprint similarity in content across publications and/or business verification. Moreover, the system 100 may be able to determine and maintain a complete record of advertisements a business has placed across multiple publications. In some examples, XML data received with an advertisement identifies the advertiser, such as by name or by another unique or non-unique identifier.

In particular aspects, machine learning techniques and/or deep learning techniques may be used to identify businesses and perform text recognition. To illustrate, a taxonomy of classification models may be generated for various business categories. If an advertisement for a plumber is received, the system 100 may determine that the advertisement most closely matches a "plumbing advertisements" model. Based on this information, the system 100 may proactively detect and correct errors. To illustrate, if text extraction on the advertisement results in the phrase "faucel repair," the system 100 may correct the phrase to "faucet repair" rather than "fossil repair," because the "plumbing advertisements" model indicates that the former is more likely to be associated with plumbers. In some cases, classification models are maintained on a per-locale basis, because different words may be used for different concepts, even in the same language. To illustrate, even though English is the predominant language in each, different "plumbing advertisements" models may be maintained for the USA, the UK, and Australia.

In a particular aspect, the image extractor 116 detects images in the content 191 that is to be published. As illustrative non-limiting examples, the image extractor 116 may perform (or initiate performance of) computer vision operations, such as image segmentation, color segmentation, image filtering, features from accelerated segment test (FAST), speeded up robust features (SURF), scale-invariant feature transform (SIFT), corner detection, edge detection, background subtraction, blob detection, etc. The image extractor 116 may identify pixels of the content 191 that correspond to images based on the output of the computer vision operations. In a particular aspect, one or more of the images extracted by the image extractor 116 may be output to the image processor 117 for further processing. To illustrate, the image processor 117 may generate multiple versions of the image(s) output by the image extractor 116. The versions may differ from each other with respect to image format (e.g., joint photographic experts group (JPG), graphics interchange format (GIF), portable network graphics (PNG), tagged image file format (TIFF), exchangeable image file format (EXIF), WebP, scalable vector graphics (SVG), etc.), color space, image resolution, etc. In some examples, different resolution versions of the images may be suitable for display on different devices (e.g., a laptop/desktop version of an advertisement, a mobile version of an advertisement, etc.), as further described herein. In a particular aspect, output of the text extractor 113, the image extractor 116, and/or the image processor 117 is stored in the memory 112.

In some examples, the data 190 may include or be accompanied by information (e.g., metadata) regarding the content 191 to the published, such as run date information, a content identifier (ID), etc. The run date information may indicate how long and/or how often the content 191 is going to be published in a newspaper. The content ID may, in some examples, correspond to a unique alphanumeric code assigned to the content 191 by the publisher or by another entity (e.g., the local business whose advertisement is going to be published in the newspaper).

An illustrative example of operations associated the data 190 is further described with reference to FIGS. 2-8. For example, FIG. 2 illustrates an example of the content 191 that is to be published in a newspaper. In FIG. 2, the content 191 is an advertisement for an establishment called Parker's Pub, which is located in Anytown, California. Continuing to FIG. 3, the data 190 may include more than just the content 191. For example, the data 190 received by the computing device 110 may further include metadata 304 regarding the content 191. The metadata 304 may include run date information, such as start and end dates for the advertisement's run in a newspaper, which in this case is the Anytown Daily. The metadata 304 may also include a content identifier (ID), which is 123456789 in the illustrated example.

Figure 4:
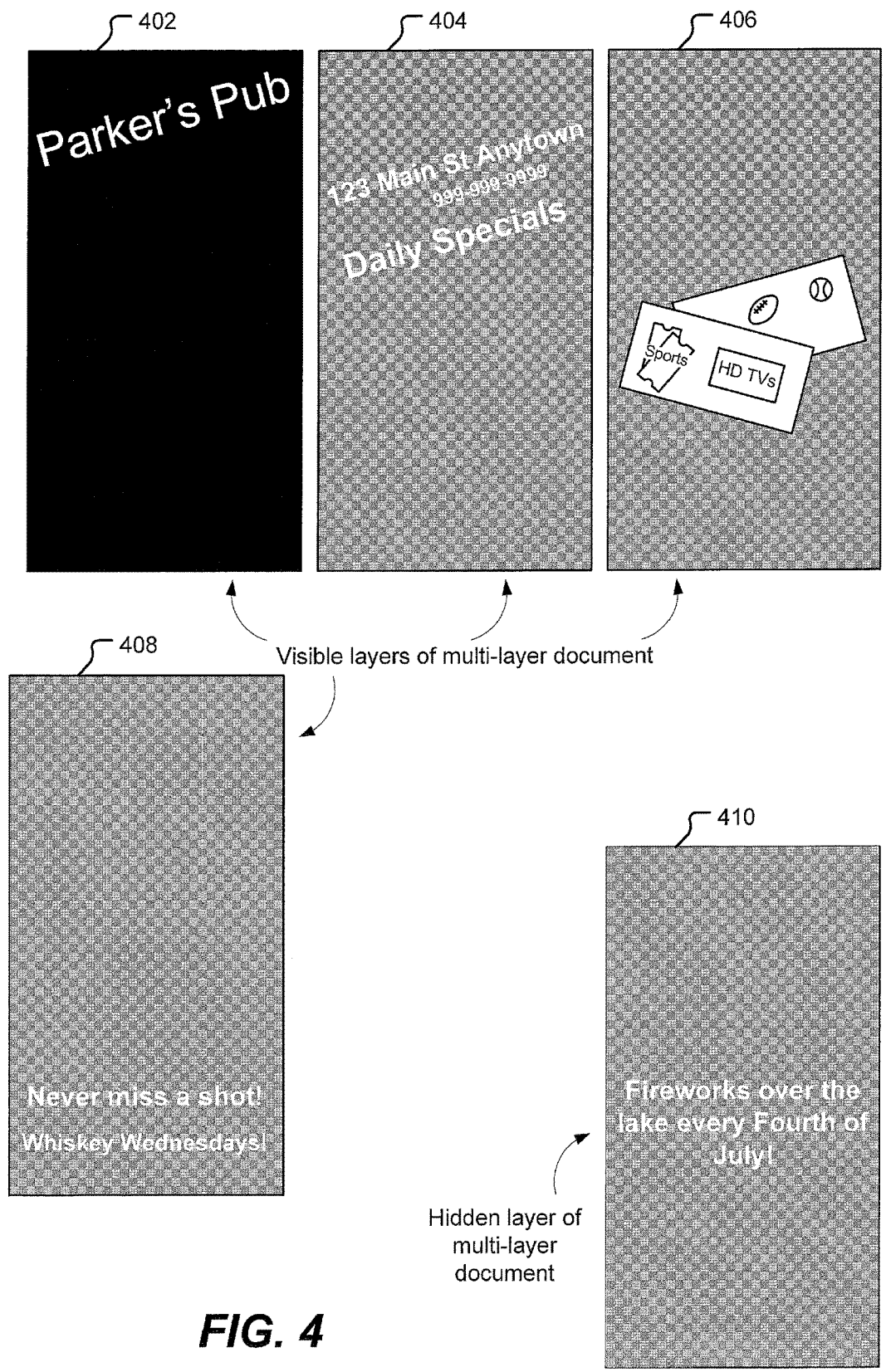
FIG. 4 is a diagram that illustrates a multi-layer document that may be processed by the system of FIG. 1.

In some examples, the data 190 indicative of the content 191 includes an image of the content 191. To illustrate, the content 191 may correspond to an image file(s) that is included in the data. Alternatively, the content 191 may correspond to a document that includes more than just images. In one example, the data 190 may include a multi-layer document file. For example, FIG. 4 depicts layers 402, 404, 406, 408, and 410 of an illustrative multi-layer document. In some aspects, the multi-layer document has a portable document format (PDF) file format. Each of the layers 402-410 may include text, pictures, or both. Thus, text extraction and/or image extraction may be performed on each of the layers 402-410.

In the illustrated example, the first layer 402 is a background layer that includes the name of the restaurant. The second layer 404 includes a street address of the restaurant, a phone number of the restaurant, and additional advertising text. The third layer 406 and the fourth layer 408 include event/offer information regarding the ability to view football games and purchase specific beverages. Each of the layers 404-410 has a transparent background, which is denoted in FIG. 4 by a checkerboard pattern.

As shown in FIG. 4, the layers of the multi-layer document may be "visible" or "hidden." For example, the layer 410 is a hidden layer that is not visible when the content 191 is printed or rendered for display. To illustrate, the hidden layer 410 may be from a previous summertime advertisement for Parker's Pub, and may include text indicating that fireworks are scheduled every Fourth of July. Thus, performing text/image extraction on the hidden layer 410 may provide additional information regarding the entity that is being advertised.

Returning to FIG. 1, the computing device 110 may generate or update a previously generated profile 119 based on the data 190. The profile 119 may be used to generate or update a previously generated directory webpage 192. To illustrate, a profile for Parker's Pub may be generated or updated based on the data 190, and a directory webpage for Parker's Pub may be generated or updated based on the profile. In an illustrative example, the profile 119 includes various information based on text and/or images extracted from the data 190. To illustrate, FIG. 5 depicts an example of the profile 119. As shown in FIG. 5, the profile 119 may include a name, an address, a city, a state, a zip code, a latitude, a longitude, a phone number, an e-mail address, hours of operation, keywords, a description, features, coupon information, coupon expiration information, offers/specials, a website, social networking information, directory information, review aggregator information, reviews, pictures, other information, or any combination thereof.

In a particular embodiment, generating/updating the profile 119 includes utilizing text and/or images extracted from the data 190. For example, as shown in FIG. 5, the name, address, city, phone number, features, and offers/specials in the profile 119 are populated based on the data 190.

In some aspects, machine learning models may be used to determine whether extracted text is a business name, a phone number, a URL, offer information, etc. To illustrate, a model may be trained to predict likely locations and characteristics of various information in a print advertisement (e.g., the model may indicate that a text in a large font near the top/center of the advertisement or at the bottom/center of the advertisement along with an address is most likely the name of a business, the model may indicate that a sequence of ten numeric characters is most likely a telephone number, a sequence of five numeric characters is most likely a zip code, an alphanumeric sequence without spaces and with at least one period may be a URL, etc.). In a particular embodiment, the model may predict, based on the type and size of an advertisement, a likely range of fonts, font sizes, locations etc. for business name, business logo, business URL, business phone number, etc. This information may be used to crop and extract various information regarding an advertiser. Such models may, in some cases, be maintained on a per business-category and per-locale basis. To illustrate, certain information may be likely to be located at the bottom of a car dealership advertisement but may likely to be located at the top of a restaurant advertisement. As another example, typical telephone number or zip code formats may be different for the US vs. the UK vs. Australia.

In some cases, computer vision models are used to categorize extracted images. For example, computer vision models may be trained to distinguish between business logos, interior business photos, exterior business/building photos, maps, pictures of humans or nonhumans, etc. In some examples, a business name or logo may be extracted from a picture of a business storefront. In some example, cloud services may be used to "improve" an image. For example, for PDF files, business logos are typically included as high-quality vector images. Conversely, in the case of a print advertisement scan, the logo of the business may be small and/or blurry. To improve upon the small/blurry logo extracted from a print advertisement scan, a reverse image search may be performed using a cloud service. The reverse image search may find additional versions of the input image, for example a high-quality version of the business's logo from the official website of the business.

In a particular embodiment, the profile 119 may be augmented based on previously encountered information regarding the advertising entity (e.g., Parker's Pub), where such information is stored in the memory 112 or is available from the publisher. In the example of FIG. 6, an e-mail address for Parker's Pub added to the profile 119. A uniform resource locator (URL) of the directory webpage 192 is also added to the profile 119. To illustrate, the directory webpage 192 for Parker's Pub may have previously been created, such as based on the earlier "Fireworks over the Lake every Fourth of July!" advertisement referenced in FIG. 4.

In a particular embodiment, the profile 119 may be augmented based on automatically searching for and retrieving profile information 193, 194, 195 (e.g., via application programming interfaces (APIs) other data sources, including but not limited to one or more of the social network 150, the review aggregator 160, or the media streaming website 170. To illustrate, as shown in FIG. 7, a state, a zip code, a website, a latitude, a longitude, hours of operation, a description, reviews, pictures, social network profile URLs, and/or other information may be added to the profile 119 based on automatically searching other data sources based on information that was previously added to the profile 119.

In a particular embodiment, after the profile 119 is created/updated, the verifier 118 may verify the information in the profile. In some examples, the verification process is fully automatic, and includes accessing various internet sources to confirm all or a portion of the information in the profile 119. Alternatively, or in addition, human verification may be performed to confirm all or a portion of the information in the profile 119 (e.g., a human may be able to note errors that are difficult for automatic verification processes to identify). In some cases, profile information for an advertiser may be verified when the advertiser is first encountered, but verified advertisers may not be re-verified to save computational resources. Moreover, verification may be skipped if the fingerprint of the advertisement being processed matches the fingerprint of a previously processed advertisement.

In a particular aspect, automatically verifying the profile 119 or a portion thereof may include navigating to a webpage indicated by a URL or social networking profile determined from received content. The webpage, including underlying HTML code, may be "scraped" and the results of the scraping process may be compared to the data in the profile 119. In some examples, additional webpages that are navigable from the original webpage (e.g., via hyperlinks) may also be "scraped." If any scraping results match a piece of information in the profile 119, that piece of information may be considered as being verified.

In some examples, a manual verification process is used in addition to the above-described automatic verification. For example, an advertisement may be inserted into a manual verification queue. The advertisement may then be shown to multiple users along with a number of options (e.g., five options) for which business the advertisement is associated with. In some aspects, the options are advertisers that are present in the system. If all or a majority of the users select the same business from the list of options, then the result is a multi-keyed verification and the profile 119 is considered verified.

In some aspects, profile verification includes examining databases of publicly available information. To illustrate, business entity databases at various Secretary of State and other regulatory/filing websites may be checked to verify information in the profile 119. As an example, the text "Joe's Plumbing" may be extracted from an advertisement. The verifier 118 may query Secretary of State databases using the text "Joe's Plumbing" and variations thereof (e.g., "Joe's Plumbing, Inc.", "Joe's Plumbing Ltd.", "Joseph's Plumbing," etc.) to verify the business name in the profile 119. Once a filing is found at a Secretary of State database, additional information, such as an address, a telephone number, etc. may also be compared and verified.

As another example, if a telephone number is extracted from an advertisement, a reverse lookup operation may be used to verify the business name associated with the telephone number. As another example, an application programming interface (API) may be used to place a telephone call to an extracted telephone number and ask an automated question, such as "Hi, is this Joe's Plumbing?" If the call is unanswered, if a fax tone is detected at the other end of the call, or if a person at the other end of the call says "No" or "Wrong Number," then business name verification may fail. Conversely, if the person answering the call says "Yes" or "Joe's Plumbing" (as determined by a speech/voice recognition module of the system 100), business name verification succeeds.

As another example, the system 100 may maintain or have access to a list of commonly used e-mail domains. If a text string extracted from an advertisement matches a domain in the list, the system 100 may determine that the text string is an e-mail address rather than the domain name for the business. Similarly, if an extracted text string includes the '@' or '#' characters, the system 100 may determine that the text string corresponds to a social networking profile or tag, and may attempt to verify the social networking profile or tag by navigating to a corresponding social networking website, such as Facebook, Instagram, Snapchat, Twitter, LinkedIn, etc.

The computing device 110 may be configured to perform, initiate, or request various actions based on the data 190, the profile 119, and/or the directory webpage 192. For example, the computing device 110 may implement a digital campaign for the content 191 that is indicated by the data 190 and that is to be published in local print media (e.g., a digital campaign for the Parker's Pub print advertisement). In particular aspects, implementing the digital campaign for the content 191 may include providing data to one or more other internet domains 142, as further described herein.

As an example, the directory webpage 192 may be used for localized search engine optimization (SEO). To illustrate, the computing device 110 may provide the directory webpage 192 for hosting at the internet domain 130 of the publisher rather than the advertising entity's (e.g., local business') internet domain 140. In a particular example, the directory webpage 192 may be hosted at a specific subdomain of the publisher's internet domain. To illustrate, the profile for Parker's Pub may be hosted at a "mylocal" subdomain of the Anytown Daily's internet domain, e.g., at a URL starting with "mylocal.anytowndaily.com," as indicated in FIG. 6. Hosting the directory webpage 192 at the newspaper's internet domain may be advantageous to hosting the directory webpage 192 at the advertiser's own internet domain, for example because the newspaper's domain may be higher ranked in search engine results than the advertiser, which may be a local business with a small internet presence. Hosting the automatically generated directory webpage for Parker's Pub at a subdomain of the Anytown Daily may thus "piggyback" on the Anytown Daily's internet footprint for SEO. Moreover, the directory webpage 192 may include one or more links to the advertiser's internet domain. For example, the directory webpage 192 may link to the second internet domain 140, such as Parker's Pub own ppubanytown.com domain, which may result in promoting ppubanytown.com in search results generated by various internet search engines.

As another example, the computing device 110 may transmit a digital version of the Parker's Pub advertisement for placement on various websites corresponding to the internet domains 142. To illustrate, the image processor 117 may generate various versions of an advertisement that is to be published in a newspaper and the text extractor 113 may extract various text strings from the advertisement, as described above. The resulting images and text may be used to generate graphical internet advertisements, banner advertisements, search listings advertisements, search keyword advertisements, mobile device advertisements, in-game advertisements, etc. To illustrate, the computing device 110 may initiate a search engine marketing (SEM) campaign, including purchasing search listings advertisements and/or search keyword advertisements. FIG. 2 illustrates an example of a dynamically generated advertisement 202 that the computing device 110 may generate based on the content 191, e.g., the Parker's Pub print advertisement.

In particular aspects, the computing device 110 may generate digital advertisements using advertisement templates stored at the computing device 110. To illustrate, the computing device 110 may determine that the Parker's Pub advertisement of FIG. 2 includes text regarding specific well drinks on Tuesdays. In response, the automatically generated advertisement may represent a related internet or mobile coupon (e.g., "$1.00 of well drinks on Tuesday"), as shown at 202 and 204. When interacted with (e.g., selected or clicked on), an advertisement or other content generated by the computing device 110 may, in some aspects, link to a landing page that was automatically generated by the computing device 110. In some examples, the landing page is (or includes similar information to) the directory webpage 192, and/or is also hosted in a subdomain of the publisher, such as the "mylocal" subdomain described above.

In some aspects, stock photos may be automatically used in generation of digital advertisements at the computing device 110. Such stock photos may include photos with rights previously acquired by an owner of the computing device 110 and/or photos previously taken by the owner of the computing device 110 (or associated parties, such as employees or contractors). The stock photo(s) used in a generated digital advertisement may be identified based on factors that may include, but are not limited to, information extracted from the data 190 indicative of the content to be published. As an illustrative non-limiting example, a stock photo of a sports utility vehicle (SUV) may be identified for use in generating a digital advertisement based on an optical character recognition determining that the term "SUV" is found in the content (e.g., print ad) 191 and/or based on computer vision algorithms indicating that a picture of an SUV is included in the content 191. Once data and photo(s) (e.g., a background photo) are identified, the systems and methods of the present disclosure are configured to automatically generate advertisements fitting any Interactive Advertising Bureau (IAB) size.

The process of selecting stock image(s) to use in a digital campaign may include automatically trying to determine what the main content of a print ad is about. For example, if the largest text in a print ad is a discount on airfare to Las Vegas, that text may be extracted, and, in response, a stock photo of Las Vegas may be retrieved. In a particular implementation, a database of hundreds of thousands of stock images (or more) may be searchable, where the images in the database are automatically tagged using machine learning. In some examples, an image may be associated with fifty to five hundred tags. In such an implementation, the stock image database may be searched based on text extracted from the print ad to identify stock images whose tag(s) "match" the extracted text. Two tags may match if they are identical or if they are determined to be close (i.e., a "fuzzy" match using a classification ontology or other resource). In some aspects, offer information for one or more offers may be extracted from a print ad, and stock image(s) may be based on matches between tags and the offer information. The extracted offers may be A/B tested to determine which subset of offers perform best, and the best performing subset of offers may be included in the digital campaign. If there is only one offer or no offer in the print ad, category ad template text may be used.

In a particular aspect, the computing device 110 may store website templates. For local businesses that do not already have a website, the computing device 110 may automatically generate a website for the local business using a website template and the text/images extracted from the data 190, as shown at 206.

Figure 8:
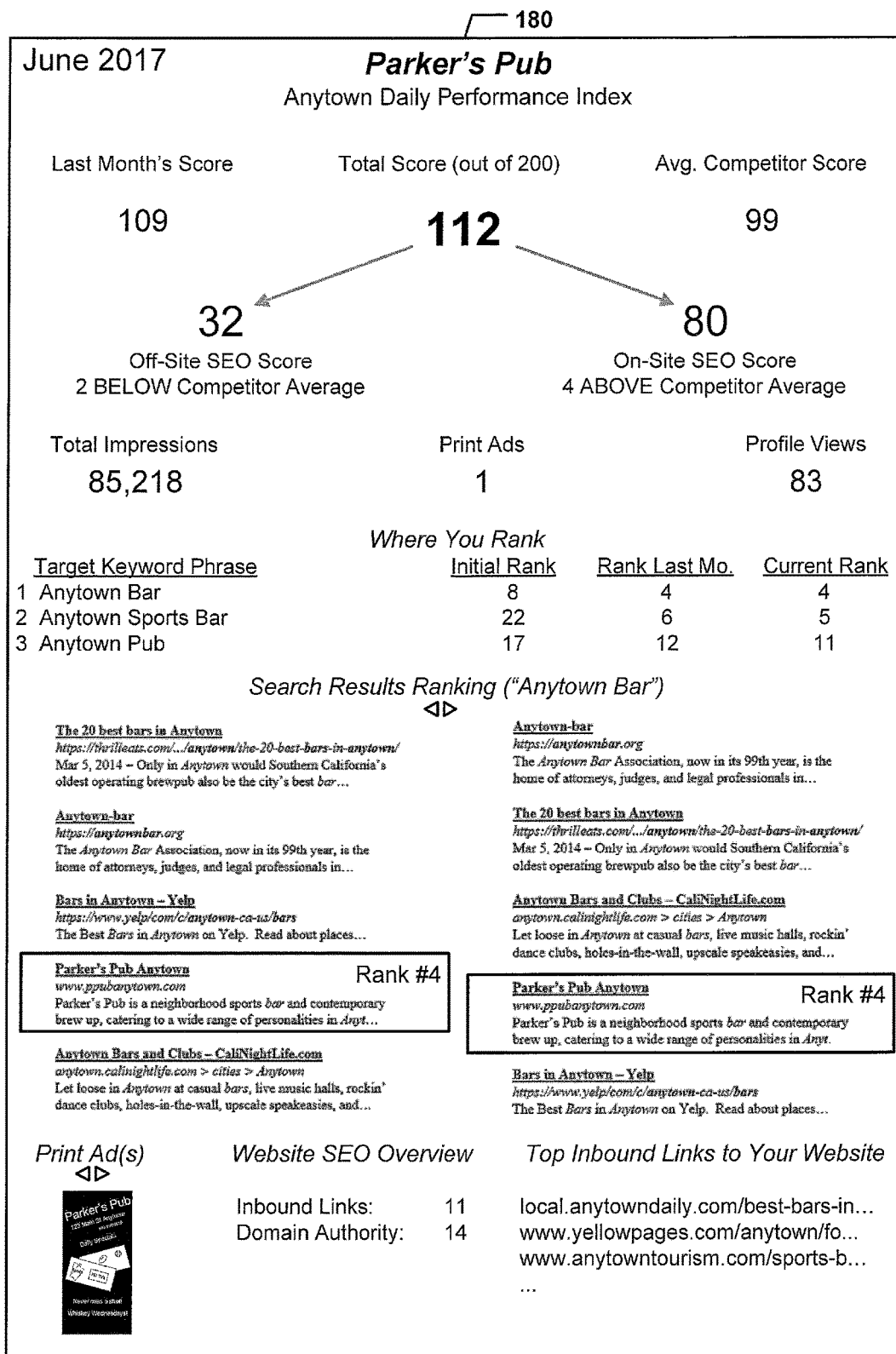
FIG. 8 is a diagram that illustrates a report that may be generated by the system of FIG. 1.

In a particular example, the computing device 110 is configured to generate periodic reports 180 regarding various digital campaigns that have been initiated for a local business. For example, FIG. 8 illustrates a particular embodiment of a report 180 for Parker's Pub. The report 180 provides quantitative scores for various metrics that measure the effectiveness of digital campaigns. To illustrate, the report 180 of FIG. 8 indicates that Parker's Pub had a total score of 112 for June 2017, as compared to a May 2017 score of 109 and an average competitor score of 99. The average competitor score corresponds to scores for other bars/restaurants in Anytown, CA.

In FIG. 8, the total score of 112 is a sum of an off-site SEO score of 32 (which is 2 below competitor average) and an on-site SEO score of 80 (which is 4 above competitor average). The off-site SEO score may correspond to elements outside of the Parker's Pub website that influence search engine interactions, such as inbound links to the Parker's Pub website, Parker's Pub social media profiles/ activity, etc. Off-site SEO may be useful to establish an online community relevance, because it may be based on recommendations from other users to recognize and use Parker's Pub content. Conversely, the on-site SEO score may correspond to elements within a landing page that determine a site's relevance and search ranking, such as written content, hypertext markup language (HTML) tags and syntax, site mapping, media (e.g., images, videos, etc.) on the page, etc.

The report 180 also indicates ranks for various search keyword phrases. For example, Parker's Pub had a current rank (in June 2017) of 4 for the phrase "Anytown Bar," which was the same as its rank in January 2016, up four spots from its initial ranking of 8. The report 180 further provides visual evidence of the ranking in the form of search result screenshots. As shown, the Parker's Pub website remained at Rank #4. In a particular embodiment, the computing device 110 or another device is configured to automatically enter keyword phrases into search engines and capture screenshots for use in reporting, for example on a daily basis.

The report 180 further includes the print advertisements that were processed during the month, a SEO overview for the Parker's Pub website, and a list of top inbound links into the Parker's Pub website. The SEO overview includes a number of inbound links and a domain authority. Inbound links, also referred to as "backlinks" may be created when another website to the Parker's Pub website. Inbound links may be used by search engines to determine search relevance. Domain authority may be a predictive score between 0 and 100 indicating how likely a webpage is to rank highly in search results.

Although specific metrics are shown in FIG. 8, it is to be understood that different metrics may be provided in alternative examples. Moreover, although FIG. 8 illustrates a monthly report, in alternative embodiments reports may be generated at a different frequency. Examples of additional information that can be included in the same or a different report include, but are not limited to:

"Reach"—A print circulation count of the local publication (e.g., newspaper), with an indication of added digital "lift" provided by the automatically generated digital campaign. For example, an "as seen by" metric may indicate that "your ad was seen by 10,000 people-6,000 in our print publication and 4,000 times on our website." Reach reporting may also indicate aggregate engagement across multiple platforms, such as calls, clicks, e-mails, coupon redemptions, etc.

"Competitor Comparison"—The number of print and digital ads that an advertiser has placed and anonymous benchmarking with other advertisers. This report may generally indicate that the more ads that are placed, the more beneficial the results of the automatically generated digital campaign (e.g., "On average, your competitors advertise 1.4 times more often and get 150% more views than you."). In some examples, the report may include interactive elements that enable placing more ads.

"Edit Data"—Advertisers may be provided the ability to correct data and/or rebuild ads from within a report.

An applicable date range of the report may be user-adjustable, and such adjustment may result in real-time updates to the metrics shown in the report (e.g., reach, online reach, engagement, competitor comparison, search rank, etc.). The dynamic report may also present a unified interface via which both the print advertisement and its one or more digital counterparts (e.g., multiple digital counterparts may be created using different stock photos and different IAB sizes) can be viewed.

Figure 1C:
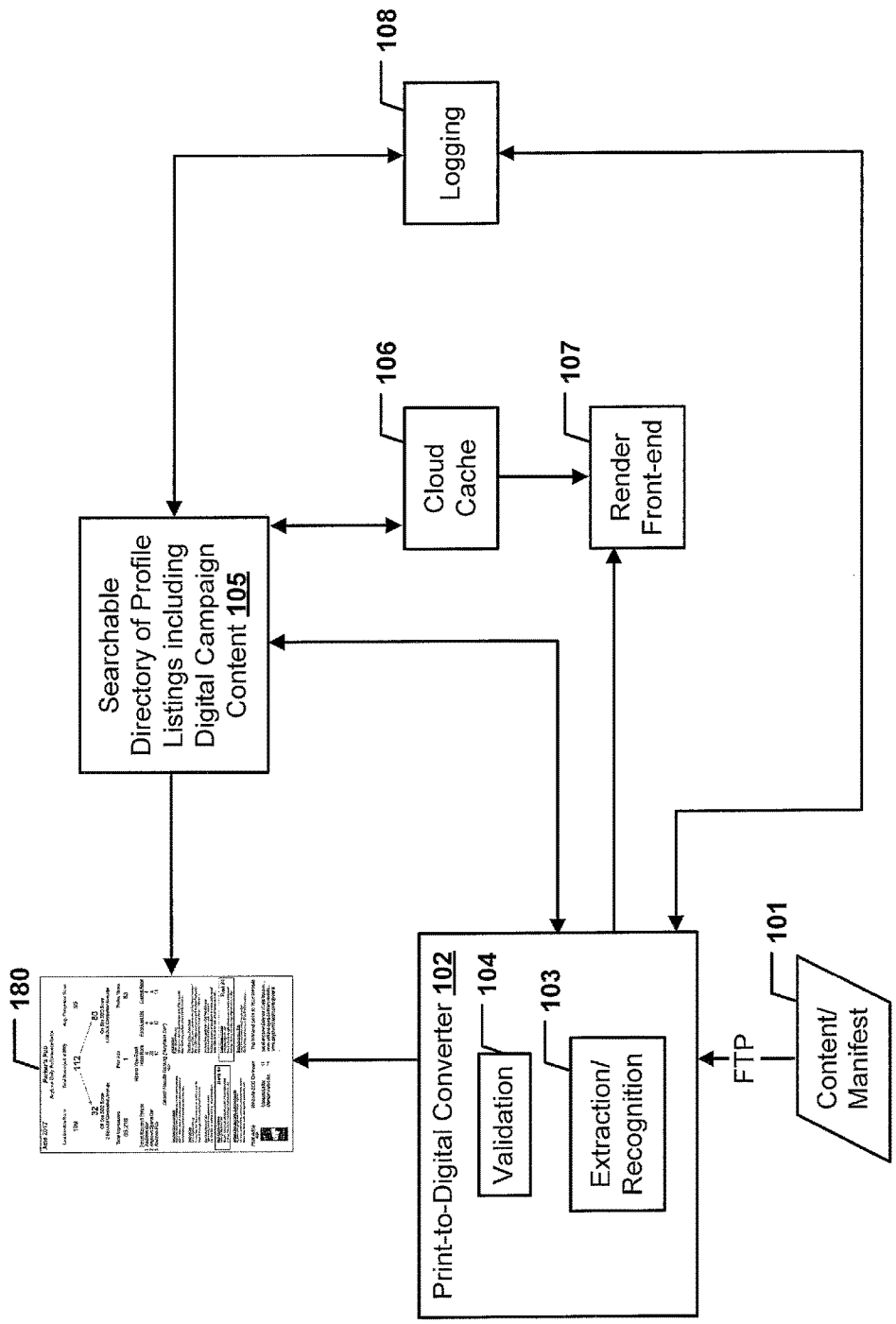
Figure 3:
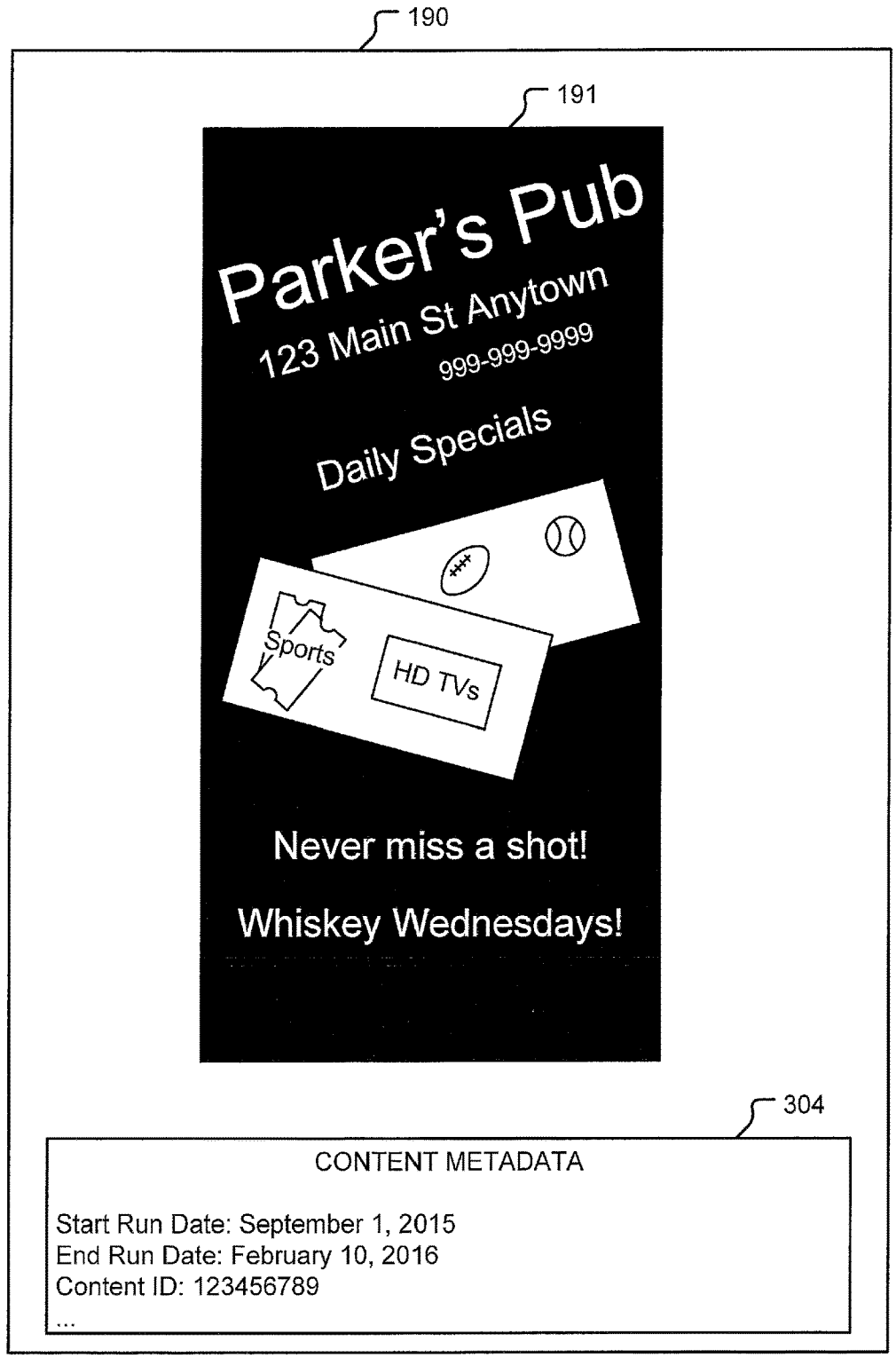
FIG. 3 is a diagram that illustrates data that may be processed by the system of FIG. 1.

FIG. 1C illustrates an example of data communication that may occur in a system operable to generate digital campaigns. In an illustrative aspect, one or more components shown in FIG. 1C may correspond to one or more components shown in FIG. 1A and/or FIG. 1B. Communication between the various components shown in FIG. 1C may occur via push or pull messaging.

FIG. 1C shows content and/or a manifest 101 being received by a print-to-digital converter 102 via file transfer protocol (FTP). The content/manifest 101 may be pushed to the converter 102 by a computer server associated with a publisher or may be pulled by the converter 102 (e.g., the converter may use login information to access a specific FTP location at the computer server associated with the publisher). In an illustrative example, the content/manifest 101 corresponds to the data 190. To illustrate, the content/ manifest 101 may include an image or document corresponding to an advertisement or other material that is to be printed in a printed publication, such as a newspaper, along with XML metadata related to the advertisement or other material.

The converter 102 includes an extraction/recognition module 103 and a validation module 104. The extraction/ recognition module 103 may extract images and/or text from the content/manifest 101, and the validation module 104 may validate extracted information, as described above with reference to the text extractor 113, the image extractor 116, and the verifier 118.

Information generated by the converter 102 may be stored at a directory 105. For example, the directory 105 may be a searchable directory of profile listings including digital campaign content. In some examples, the directory 105 includes the profile information 194, the profiles 119, and/or the directory webpage(s) 192. The directory 105 may be accessible via a subdomain of a print publisher, as described above. The directory 105 may also support various indexing and statistical operations. For example, the directory 105 may track impressions and may serve specific digital campaign content based on random or impression-based weights. The directory 105 may also track searches and search results.

In a particular aspect, data stored in the directory 105 is also cached at one or more cloud-based servers representing a cloud cache 106. Use of the cloud cache 106 may provide load balancing and fault tolerance as compared to a single directory 105 storing all digital campaign and business profile data. As explained above, the directory 105 may include landing pages that are generated based on specific print ads and may also include business profile pages. In some examples, such webpages are made available at the cloud cache 106 and are accessible via a subdomain of the print publisher. For example, servers corresponding to the subdomain may execute a lightweight rendering front-end 107 that displays campaign content, advertisements, social network information, articles, etc. on webpages.

In some examples, the directory 105 supports reporting operations. For example, the report 180 of FIG. 8 may be generated based on data stored in the directory 105 and based on data generated by the converter 102. In a particular aspect, a logging module 108 is included in the system. For example, the logging module 108 may aggregate log information generated by the converter 102 and the directory 105. The logging module 108 may also host a log viewing application configured to parse such log information and generate graphical user interface(s) that are accessible via the Internet and that are operable to peruse the logging information.

Although not shown in FIG. 1C, various other components or devices may also communicate with the converter 102 and/or the directory 105. For example, a billing system may generate invoices for individual advertisers based on information regarding specific advertisements from the converter 102 and/or information regarding online impressions, click through rate, etc. from the directory 105 and the cloud cache 106.

In alternative embodiments, functional components of the system may be organized differently. For example, the system may include an upload tier, a partner management tier, a user management tier, a fulfillment tier, an image processing tier, a business identification tier, a business management tier, an order management tier, and/or a category management tier. The upload tier may support uploading of content that is planned to run in a printed publication and metadata regarding such content. The partner management and user management tiers may support creating or modifying partner and user profiles. The fulfillment tier and the order management tier may support placing orders for digital campaigns at various websites, publications, etc. The image processing tier may support resizing and publishing extracted images. The business identification tier may support identifying and verifying of businesses. The business management tier may maintain profile information for businesses, including business ID, category ID, name, logo, etc. The category management tier may be used to create additional business categories (e.g., "restaurant," "plumbing," "car dealership," etc.) and assign category IDs. In some examples, the categories created by the category management tier may also be used in organizing the stock images described above.

In some embodiments, authentication and authorization operations may be performed in conjunction with the described systems and methods. For example, OAuth operations or other login operations may be performed before accessing the directory 105. Different authorization information may be provided to publishers, advertisers, etc. In some examples, javascript object notation (JSON) web tokens (JWTs) are used for authentication/authorization. In illustrative aspects, JWTs associated with cloud service providers may be used for communication between applications, services, and data storage.

FIG. 1 thus illustrates a system 100 that is configured to automatically generate and track a digital campaign based on print content that is to be, or that has previously been, published by a publisher (e.g., a print publisher, such as a local newspaper). The digital campaign may enable the publisher and the content owner (e.g., an advertiser) to generate internet-based revenues and presence without having to generate or promote internet-specific content. For example, an illustrative metropolitan area may include 10,000 businesses, and 1,000 of those businesses may advertise in the local newspaper for that metropolitan area. In some examples, the local newspaper may own or be associated with smaller newspapers that are dedicated to various geographic zones, such as to individual suburbs or towns. Based on market factors, it may be determined that those 1,000 businesses may be willing to pay $500 for an advertisement in the local newspaper (which may run for a single day, for a week, etc.). As more and more people attempt to find local businesses information online rather than in print media, the described system may provide far more than $500 of advertising/marketing value to a local business. Thus, in some examples, the digital campaign creation/reporting service provided by the system 100 of FIG. 1 may represent an opportunity for a local newspaper to upsell to local businesses.

Figure 9:
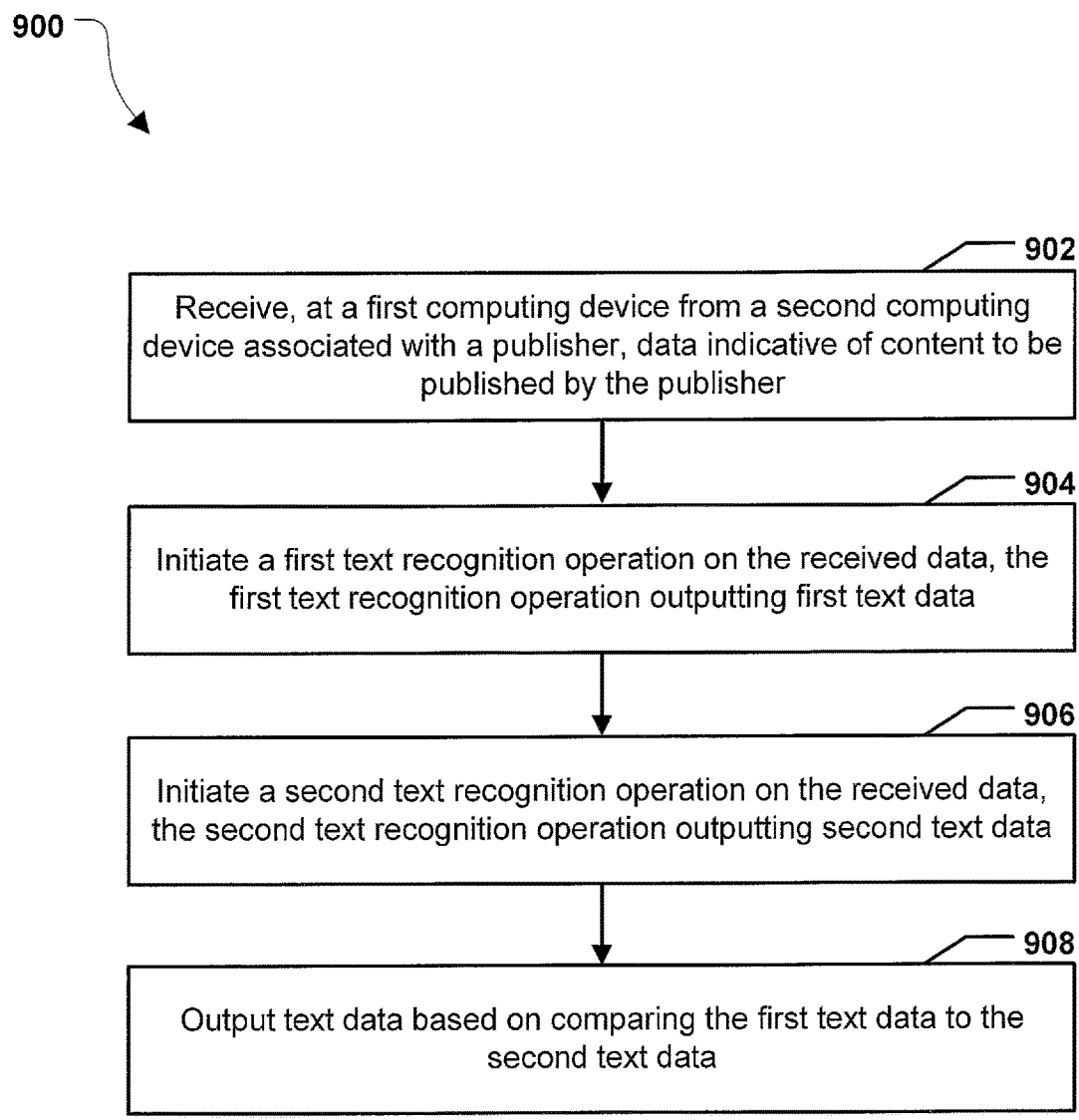
FIG. 9 is a flowchart of a particular embodiment of a method of operation at the system of FIG. 1.

Referring to FIG. 9, a flowchart of an illustrative method 900 of operation in accordance with the present disclosure is shown. In a particular example, the method 900 may be performed in the system 100 of FIG. 1.

The method 900 includes receiving, at a first computing device from a second computing device associated with a publisher, data indicative of content to be published by the publisher, at 902. For example, referring to FIG. 1, the computing device 110 may receive the data 190 from the second computing device 120 associated with the publisher, where the data 190 is indicative of the content 191 to be published by the publisher.

The method 900 also includes initiating a first text recognition operation on the received data, the first text recognition operation outputting first text data, at 904. For example, referring to FIG. 1, the text extractor 113 may initiate the first text recognition operation 114 to generate first text data.

The method 900 further includes initiating a second text recognition operation on the received data, the operation text recognition process outputting second text data, at 906. For example, referring to FIG. 1, the text extractor 113 may initiate the second text recognition operation 115 to generate second text data.

The method 900 includes outputting text data based on comparing the first text data to the second text data, at 908. For example, referring to FIG. 1, the text extractor 113 may output text data based on the first text data output by the first text recognition operation 114 and the second text data output by the second text recognition operation 115.

Figure 10:
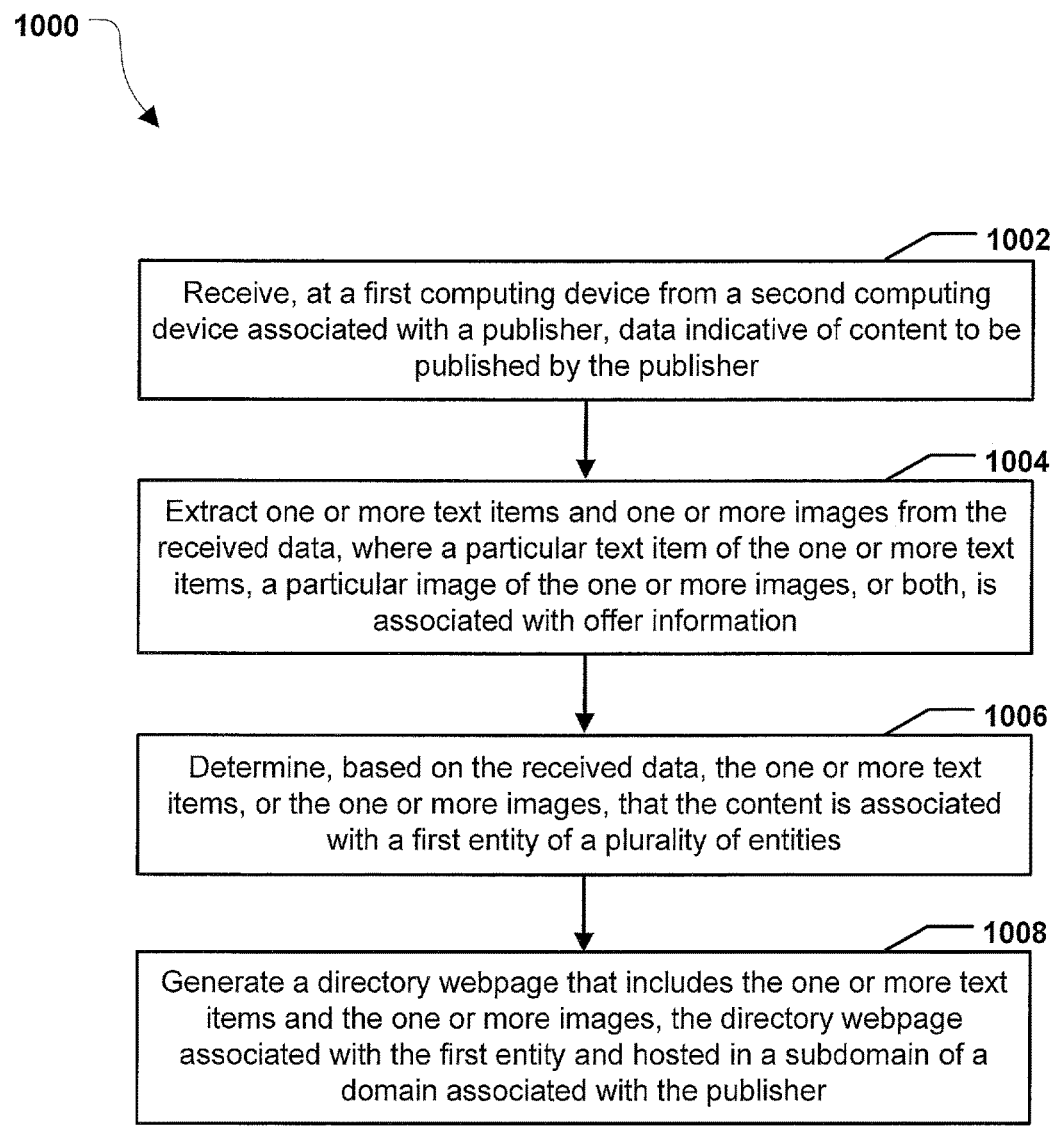
FIG. 10 is a flowchart of another particular embodiment of a method of operation at the system of FIG. 1.

Referring to FIG. 10, a flowchart of an illustrative method 1000 of operation in accordance with the present disclosure is shown. In a particular example, the method 1000 may be performed in the system 100 of FIG. 1.

The method 1000 includes receiving, at a first computing device from a second computing device associated with a publisher, data indicative of content to be published by the publisher, at 1002. For example, referring to FIG. 1, the computing device 110 may receive the data 190 from the second computing device 120 associated with the publisher, where the data 190 is indicative of the content 191 to be published by the publisher.

The method 1000 also includes extracting one or more text items and one or more images from the received data, where a particular text item of the one or more text items, a particular image of the one or more images, or both, is associated with offer information, at 1004. For example, referring to FIG. 1, the text extractor 113 may extract one or more text items and the image extractor 116 may extract one or more images from the data 190. A particular extracted text item or a particular extracted image may correspond to offer information. Offer information may, for example, be associated with an offering of a particular good or service and may, in some examples, have an associated expiration date or validity time period(s). To illustrate, offer information regarding Tuesday well drinks may be extracted from the Parker's Pub advertisement shown in FIG. 2.

The method 1000 further includes determining, based on the received data, the one or more text items, or the one or more images, that the content is associated with a first entity of a plurality of entities, at 1006. For example, referring to FIG. 1, the computing device 110 may determine that, of the hundreds or thousands of local businesses for which profiles have been previously populated, the content 191 being processed is an advertisement for Parker's Pub in Anytown.

In some examples, information in a business profile may automatically be verified. For example, referring to FIG. 1, the computing device 110 may verify that the telephone number, street address, etc. for Parker's Pub is correct by, for example, retrieving webpages from Parker's Pub's own website and comparing data present on those webpages to the data included in the business profile for Parker's Pub. In other examples, webpages including reviews of the business, social networking pages of the business, etc. may be used to verify information in the business profile. This automated verification process may help catch text/image extraction errors and third-party data errors.

The method 1000 includes generating a directory webpage that includes the one or more text items and the one or more images, the directory webpage associated with the first entity and hosted in a subdomain of a domain associated with the publisher, at 1008. For example, referring to FIG. 1, the directory webpage 192 may be provided for hosting to the domain of the publisher (e.g., the Anytown Daily) in a particular subdomain (e.g., mylocal.anytowndaily.com). The directory webpage 192 may include text and/or images extracted from the data (e.g., extracted from the Parker's Pub print advertisement shown in FIG. 2).

It should be noted that the orders of steps described with reference to FIGS. 1-10 are to be considered illustrative, not limiting. In alternate embodiments, the order of steps may be different. Further, one or more steps may be optional and/or replaced by other steps. In addition, one or more steps may be consolidated. For example, in some examples, one or more steps of the method 000 of FIG. 9 and the method 1000 of FIG. 10 may be combined.

Although the foregoing describes generation of digital campaigns based on content that is to be published in a printed publication, in alternative aspects the techniques of the present disclosure may be applied to audio or video content as well. For example, the content 191 may be a video file or an audio file rather than an image or PDF file of print content. In some examples, the video file includes a video advertisement that is to be broadcast on television and/or presented on the Internet. Similarly, the audio file may include an audio advertisement that is to be broadcast on terrestrial or satellite radio and/or presented on the Internet.

If the content 191 includes video, text extraction and recognition may be performed on individual frames of video. For example, OCR processes may be performed on all frames of video, only on intracoded frames (I-frames) of video, only on frames that are detected as having been marked with a metatag to indicate that they include text content, etc. Alternatively, or in addition, text may be extracted from metadata associated with the video and/or subtitles or closed captions associated with the video. Such subtitles or closed captioning may be "hardcoded" into the video frames or may be provided in a separate track of the video. In some examples, machine/deep-learned models may indicate where hardcoded captions are likely to be in each frame of video. For example, a model may indicate that hardcoded captions are likely to be at the bottom of video frames unless the bottom of video frames include rapidly changing content of interest (in which case the captions may be likely to be near the top of the video frames) or a dialogue between actors (in which case the hardcoded captions may be predicted to be closer to the actors in the video frames).

In some aspects, different models for different business categories may make different predictions about the location of text (e.g., the models may predict that pizza delivery advertisements include phone numbers in a different video frame location than car dealership advertisements).

If the content 191 includes audio (e.g., the content 191 is an audio-only advertisement or is an advertisement that includes both audio and video), text extraction may be performed on the audio. In some examples, text extraction is performed based on a caption track associated with the audio. Alternatively, or in addition, speech-to-text engine(s) may receive the audio as input and may generate text content from the audio. Regardless of whether the content includes video or audio, similar operations as described above may be used to generate digital campaign content after the text is extracted from the video or audio. In some examples, the video or audio may be uploaded to social networks, media hosting websites, etc. as part of the digital campaign. The video/audio may be included in the landing pages and/or directory pages described above, may be used to generate additional content (e.g., coupons, websites, etc.) as described above, etc.

In particular examples, one or more aspects of the present disclosure may be implemented, embodied, or carried out by a single computing device or by a combination of computing devices configured to communicate with each other. Examples of computing devices include, but are not limited to, laptop computers, desktop computers, mobile phones, tablet computers, portable media players, wearable devices, televisions, set-top boxes, game consoles, sensor devices, etc.

A computing device in accordance with the present disclosure may include one or more computer-readable storage devices and one or more processors (e.g., a central processing unit (CPU), a digital signal processor (DSP), a graphics processing unit (GPU), etc.). The storage device(s) may be implemented as read-only memory (ROM), random access memory (RAM), and/or persistent storage, such as a hard disk drive, a flash memory device, a solid-state device, or other type of storage device. Such storage device(s) may be configured to store instructions executable by the processor(s) to perform one or more of the functions or methods herein. A computer-readable storage device is not a signal.

A computing device may also include a location device (e.g., a global positioning system (GPS) transceiver) and one or more wireless transceivers that enable the computing device to exchange signals with (e.g., receive signals from and/or send signals to) other devices. Each wireless transceiver may include or be coupled to radio frequency (RF) circuitry, a controller, and/or an antenna. In illustrative examples, the wireless transceivers include a third generation (3G) transceiver, a fourth generation (4G) transceiver, a Wi-Fi transceiver, a near field communication (NFC) transceiver, a BLUETOOTH (BLUETOOTH is a registered trademark of Bluetooth SIG, Inc. of Kirkland, Wash., USA) or BLUETOOTH low energy (BLE) transceiver, or any combination thereof. Wireless transceivers may be used for direct peer-to-peer communication and communication via one or more networks, such as the internet.

A computing device may further include or be coupled to input devices and output devices. For example, a computing device may include or may be coupled to a display device, a microphone, a speaker, and/or a user input device (e.g., a touchscreen, a keyboard, a mouse, a stylus, etc.). Such devices may be external to the computing device or may be integrated into a housing of the computing device, such as in the case of a mobile phone or tablet computer.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the computing device 110, the second computing device 120, the first internet domain 130, the second internet domain 140, the social network 150, the review aggregator 160, the media streaming website 170, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

In a particular embodiment, a method includes receiving, at a first computing device from a second computing device associated with a publisher, data indicative of content to be published by the publisher. The method also includes initiating a first text recognition operation on the received data, the first text recognition operation outputting first text data and initiating a second text recognition operation on the received data, the second text recognition operation outputting second text data. The method further includes generating output text data based on comparing the first text data to the second text data.

In another particular embodiment, an apparatus includes a processor and a memory storing instructions executable by the processor to perform operations including receiving, at a first computing device from a second computing device associated with a publisher, data indicative of content to be published by the publisher. The operations also include extracting one or more text items and one or more images from the received data and determining based on at least one of the received data, the one or more text items, or the one or more images, that the content is associated with a first entity of a plurality of entities. The operations further include generating a directory webpage that includes the one or more text items and the one or more images, the directory webpage associated with the first entity and hosted in a subdomain of a domain associated with the publisher. A particular text item of the one or more text items, a particular image of the one or more images, or both, is associated with offer information.

In another particular embodiment, a computer-readable storage device includes instructions that, when executed by a processor, cause the processor to perform operations including receiving, at a first computing device from a second computing device associated with a publisher, data indicative of content to be published by the publisher. The operations also include initiating a first text recognition operation on the received data, the first text recognition operation outputting first text data, initiating a second text recognition operation on the received data, the second text recognition operation outputting second text data, and generating output text data based on comparing the first text data to the second text data. The operations further include extracting one or more images from the received data and determining based on at least one of the data indicative of the content, the output text data, or the one or more images, that the content is associated with a first entity of a plurality of entities. The operations include accessing an internet webpage associated with the first entity and automatically verifying a particular extracted text item based on comparing the particular extracted text item to the internet webpage. The operations also include generating a directory webpage that includes the one or more text items and the one or more images, the directory webpage associated with the first entity and hosted in a subdomain of a domain associated with the publisher.

The illustrations and aspects of the disclosure described herein are intended to provide a general understanding of the disclosure and are not intended to exhaustively illustrate all possible aspects, some of which may incorporate substitute arrangements to achieve the same or similar objectives. The present disclosure covers any and all subsequent adaptations or variations of aspects described herein.

It is to be understood that the figures may not be drawn to scale, and the Abstract is not to be used to interpret or limit the scope or meaning of the claims. In addition, the use of the terms invention, embodiment, aspect, or example do not require that the described features be grouped together. The disclosure is not to be interpreted as intending any claimed aspect, example, or embodiment to require more elements than recited in a claim.

The subject matter described herein is thus illustrative rather than restricting, and the claims are intended to cover all falling within the scope of the present disclosure. To the maximum extent allowed by law, the scope of the present disclosure is to be determined by the broadest permissible interpretation of the following claims (which are hereby incorporated into the detailed description) and their equivalents, and shall not be restricted or limited by the foregoing detailed description.

What is claimed is:

1. A computer-readable storage device storing instructions that, when executed by a processor, cause the processor to perform operations comprising:
    receiving, at a first computing device from a second computing device associated with a publisher, data indicative of content to be published by the publisher;
    initiating, at the first computing device:
        a first text recognition operation on the received data to output first text data; and
        a second text recognition operation on the received data to output second text data;
    generating output text data based on comparing the first text data to the second text data;
    extracting one or more images from the received data;
    determining based on at least one item of the received data, the generated output text data, or the one or more images, that the content is associated with a first entity of a plurality of entities;
    accessing an internet webpage associated with the first entity;
    automatically verifying at least part of the first text data or the second text data based on comparing at least the part to the internet webpage; and
    generating a webpage that:
        includes the generated output text data, the one or more images, and an address indicating the publisher and the first entity; and
        is hosted in a subdomain of the publisher.

2. The computer-readable storage device of claim 1, wherein:
    the internet webpage corresponds to a website of the first entity, a review of the first entity, or a social networking page of the first entity, and
    the first text recognition operation and the second text recognition operation are performed on a common content item of the received data.

3. An apparatus comprising:
    a processor; and
    a memory storing instructions executable by the processor at a first computing device to perform operations comprising:
        receiving, from a second computing device associated with a publisher, data indicative of content to be published by the publisher;
        extracting one or more text items and one or more images from the received data;
        determining based on at least one item of the received data, the one or more text items, or the one or more images, that the content is associated with a first entity of a plurality of entities; and
        generating a webpage that:
            includes the one or more text items, the one or more images, and an address indicating the publisher and the first entity; and
            is hosted in a subdomain of the publisher.

4. The apparatus of claim 3, wherein:
    the determining includes identifying the first entity, by the processor, based on the content and based on a set of profiles stored in the memory prior to the receiving, and
    the webpage is based on a profile of the identified first entity.

5. The apparatus of claim 3, wherein a text item of the text items and an image of the images each indicate an identity of the first entity, and wherein the content includes an advertisement to be published in a newspaper associated with the publisher.

6. The apparatus of claim 3, wherein the one or more text items include an entity name, a street address, a date or date range, a telephone number, an e-mail address, event information, or any combination thereof, and wherein the one or more images include a logo, a photograph, a drawing, or any combination thereof.

7. The computer-readable storage device of claim 1, wherein at least one of the first text data or the second text data includes a text item associated with an image or document of the received data, and wherein the operations further comprise determining a confidence value for the text item based on one or more of:
    a sharpness of lines, edges, corners, or curves of the text item;
    an amount of noise present in the image or document; or
    a similarity between a font of the text item and a font stored at the first computing device.

8. The computer-readable storage device of claim 1, wherein the webpage is associated with directory information that is:
    accessible to a plurality of internet search engines; and
    associated with a plurality of advertising entity profiles stored at the first computing device.

9. The apparatus of claim 3, wherein the one or more text items and one or more images comprises one or both of: coupon information and a particular offering of a good or a service that has an expiration date or a validity time period.

10. The apparatus of claim 3, wherein the received data comprises a multi-layer document file that includes a hidden layer, and wherein the operations further comprise extracting at least one of the one or more text items or the one or more images from the hidden layer.

11. The apparatus of claim 3, wherein the operations further comprise:
    extracting an item of text associated with an image or document of the received data; and
    determining a confidence value for the item of text based on an image quality or a document quality associated with the image or document.

12. The apparatus of claim 3, wherein the received data comprises metadata associated with the content, and wherein the metadata includes run date information associated with the content, a content identifier (ID) associated with the content, or both.

13. The apparatus of claim 3, wherein the operations further comprise generating, for a particular extracted image, a first version of the particular extracted image having a first image resolution and a second version of the particular extracted image having a second image resolution.

14. A method comprising:
    receiving, at a first computing device from a second computing device associated with a publisher, data indicative of content to be published by the publisher;
    at the first computing device, initiating:
        a first text recognition operation on the received data, the first text recognition operation outputting first text data associated with an entity; and
        a second text recognition operation on the received data, the second text recognition operation outputting second text data associated with the entity;
    an image extraction operation that extracts one or more images from the received data;
    based on comparing the first text data to the second text data, generating output text data indicative of the entity; and generating a webpage that:
   includes the generated output text data, one or more extracted images, and an address indicating the publisher and the entity; and
   is hosted in a subdomain of the publisher.

15. The method of claim 14, wherein at least one of the first text recognition operation or the second text recognition operation comprises an optical character recognition (OCR) operation, wherein the generated output text data indicates an identity of the entity, and wherein the webpage is hosted at both an internet domain of the publisher and an internet domain of the entity.

16. The apparatus of claim 3, wherein the content includes a first content item, and further comprising associating a first fingerprint value with the first content item.

17. The computer-readable storage device of claim 1, wherein the operations further comprise:
   determining, based on the generated output text data or the one or more images, whether the content is associated with a particular entity; and
   accessing an internet webpage associated with the particular entity conditioned on determining that the content is associated with the particular entity.

18. The method of claim 14, further comprising:
   if the first text data and the second text data include common text, including the common text in the generated output text data; and
   if the first text data includes text that is not included in the second text data, determining whether to include the text in the generated output text data based on confidence data associated with the text.

* * * * *